US012682023B2

(12) United States Patent
Tuinhof et al.

(10) Patent No.: US 12,682,023 B2
(45) Date of Patent: Jul. 14, 2026

(54) PUBLISHED CONTENT PROTECTION

(71) Applicant: INTERNATIONAL BUSINESS MACHINES CORPORATION, Armonk, NY (US)

(72) Inventors: Hessel Tuinhof, Dublin (IE); Killian Levacher, Dundrum (IE); Stefano Braghin, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1227 days.

(21) Appl. No.: 17/083,566

(22) Filed: Oct. 29, 2020

(65) Prior Publication Data

US 2022/0138287 A1    May 5, 2022

(51) Int. Cl.
*G06F 21/12* (2013.01)
*G06N 20/00* (2019.01)

(52) U.S. Cl.
CPC ........... *G06F 21/125* (2013.01); *G06N 20/00* (2019.01)

(58) Field of Classification Search
CPC .............................. G06F 21/125; G06N 20/00
See application file for complete search history.

(56) References Cited

U.S. PATENT DOCUMENTS

| | | | |
|---|---|---|---|
| 6,317,868 B1 | 11/2001 | Grimm | |
| 7,313,824 B1 | 12/2007 | Bala | |
| 7,328,453 B2 | 2/2008 | Merkle, Jr. | |
| 7,565,697 B2 | 7/2009 | Levine | |
| 9,659,338 B2 | 5/2017 | Lim | |
| 10,587,584 B2 * | 3/2020 | Vikramaratne et al. ..................... H04L 63/0428 |
| 10,679,389 B2 | 6/2020 | Allen | |
| 11,762,998 B2 * | 9/2023 | Kuta et al. ........... G06K 9/6264 |
| 2005/0021947 A1 | 1/2005 | Doyle | |
| 2008/0097922 A1 | 4/2008 | Davydov | |
| 2009/0064348 A1 | 3/2009 | Bang | |

(Continued)

OTHER PUBLICATIONS

Rizzo et al., Text Watermarking in Social Media, Jul. 2017, ASONAM '17: Proceedings of the 2017 IEEE/ACM International Conference on Advances in Social Networks Analysis and Mining 2017, pp. 208-211.*

(Continued)

*Primary Examiner* — David Yi
*Assistant Examiner* — Nicholas Shine
(74) *Attorney, Agent, or Firm* — Rakesh Roy

(57) ABSTRACT

A method, computer system, and a computer program product for published content protection is provided. The present invention may include receiving a content file from a content management system (CMS). The present invention may include extracting a feature from the received content file. The present invention may include transforming, using an adversarial generation algorithm, the received content file into an adversarial content file. The present invention may include returning the adversarial content file to the CMS. The returned adversarial content file may represent an equivalent of the received content file to a content consumer. The present invention may include preventing an application of the returned adversarial content file in at least one machine learning task based on the adversarial noise included in the returned adversarial content file.

15 Claims, 6 Drawing Sheets

(56) References Cited

U.S. PATENT DOCUMENTS

| | | | |
|---|---|---|---|
| 2015/0019311 A1* | 1/2015 | Lee et al. | G06Q 30/0214 |
| 2017/0270625 A1 | 9/2017 | Kereth | |
| 2020/0097767 A1* | 3/2020 | Perry | G06V 40/172 |
| 2020/0387829 A1* | 12/2020 | Kearney | G16H 50/70 |
| 2021/0067842 A1* | 3/2021 | Revital et al. | H04N 21/8358 |

OTHER PUBLICATIONS

Joon Oh et al., Adversarial Image Perturbation for Privacy Protection A Game Theory Perspective, Jul. 2017, IEEE International Conference on Computer Vision (ICCV).*
Shan et al., Fawkes: Protecting Privacy against Unauthorized Deep Learning Models, Jun. 2020, USENIX Security Symposium 2020.*
Hartung et al., "Multimedia Watermarking Techniques," Proceedings of the IEEE, vol. 87, No. 7, Jul. 1999, p. 1079-1107.
Hill, "The Secretive Company That Might End Privacy as we Know It," The New York Times, Published Jan. 18, 2020, Updated Feb. 10, 2020, https://www.nytimes.com/2020/01/18/technology/clearview-privacy-facial-recognition.html, 14 pages.
Joon Oh et al., "Adversarial Image Perturbation for Privacy Protection a Game Theory Perspective, "arXiv: 1703.09471v2 [cs.CV] Jul. 26, 2017, 17 pages.
Kim et al., "Digital Watermarking," Springer, 7th International Workshop, IWDW 2008, LNCS 5450, 481 pages.
Mell et al., "The NIST Definition of Cloud Computing", National Institute of Standards and Technology, Special Publication 800-145, Sep. 2011, 7 pages.
Shan et al., "Fawkes: Protecting Privacy against Unauthorized Deep Learning Models," Proc. of USENIX Security Symposium 2020, arXiv:2002.08327v2 [cs.CR] Jun. 23, 2020, 16 pages.
Song et al., "Fooling OCR Systems with Adversarial Text Images," arXiv:1802.05385v1 [cs.LG] Feb. 15, 2018, 15 pages.
Zhang et al., "Protecting Intellectual Property of Deep Neural Networks with Watermarking," ASIACCS '18: Proceedings of the 2018 on Asia Conference on Computer and Communications Security, May 2018, 13 pages.

* cited by examiner

100

PROCESSOR
104

DATA STORAGE
DEVICE 106

SOFTWARE
PROGRAM
108

CONTENT
PROTECTION
PROGRAM 110a

COMPUTER 102

COMMUNICATION
NETWORK
116

DATABASE
114

CONTENT
PROTECTION
PROGRAM 110b

SERVER 112

300

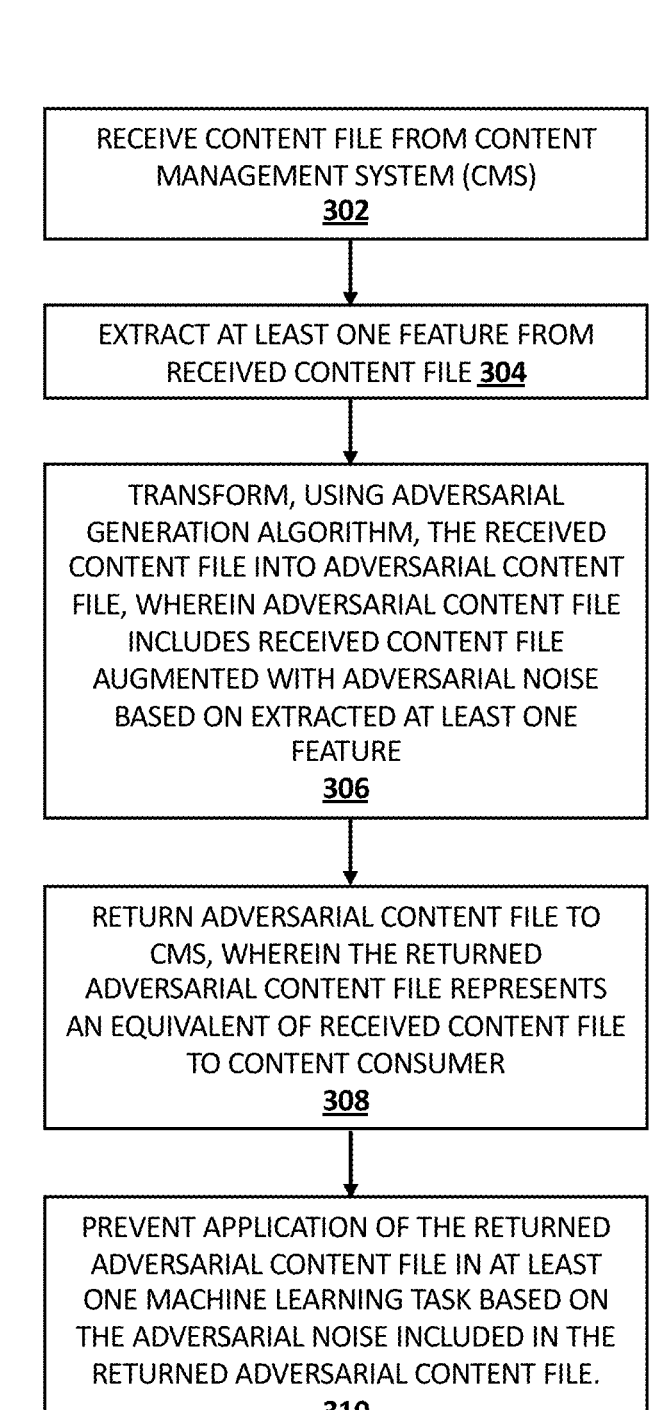

RECEIVE CONTENT FILE FROM CONTENT
MANAGEMENT SYSTEM (CMS)
302

EXTRACT AT LEAST ONE FEATURE FROM
RECEIVED CONTENT FILE 304

TRANSFORM, USING ADVERSARIAL
GENERATION ALGORITHM, THE RECEIVED
CONTENT FILE INTO ADVERSARIAL CONTENT
FILE, WHEREIN ADVERSARIAL CONTENT FILE
INCLUDES RECEIVED CONTENT FILE
AUGMENTED WITH ADVERSARIAL NOISE
BASED ON EXTRACTED AT LEAST ONE
FEATURE
306

RETURN ADVERSARIAL CONTENT FILE TO
CMS, WHEREIN THE RETURNED
ADVERSARIAL CONTENT FILE REPRESENTS
AN EQUIVALENT OF RECEIVED CONTENT FILE
TO CONTENT CONSUMER
308

PREVENT APPLICATION OF THE RETURNED
ADVERSARIAL CONTENT FILE IN AT LEAST
ONE MACHINE LEARNING TASK BASED ON
THE ADVERSARIAL NOISE INCLUDED IN THE
RETURNED ADVERSARIAL CONTENT FILE.
310

WORKLOADS

1144

1134 1136 1138 1140 1142

MANAGEMENT

1132

1122 1124 1126 1128 1130

VIRTUALIZATION

1120

1104 1106 1108 1110 1112 1114 1116 1118

HARDWARE AND SOFTWARE

1102

PUBLISHED CONTENT PROTECTION

BACKGROUND

The present invention relates generally to the field of computing, and more particularly to data protection.

A large quantity of diverse digital media content is published on the Internet and is publicly accessible. In parallel, recent developments within the field of machine learning have driven the need to build datasets of increasing diversity and size. Media content published in publicly accessible repositories can be harvested by arbitrary institutions to generate datasets needed for the purpose of building machine learning models. There are many reasons, ranging from General Data Protection Regulations (GDPR) to protecting accumulated data from competitors, for why the custodians of such repositories may not wish to make this media content available to the public for purposes other than the original publication intent of the media content. However, once this media content is harvested by third-party institutions, there is nothing preventing such institutions from using the harvested media content for the unauthorized purpose of building machine learning models.

SUMMARY

Embodiments of the present invention disclose a method, computer system, and a computer program product for published content protection. The present invention may include receiving a content file from a content management system (CMS). The present invention may include extracting a feature from the received content file. The present invention may include transforming, using an adversarial generation algorithm, the received content file into an adversarial content file. The present invention may include returning the adversarial content file to the CMS. The returned adversarial content file may represent an equivalent of the received content file to a content consumer. The present invention may include preventing an application of the returned adversarial content file in at least one machine learning task based on the adversarial noise included in the returned adversarial content file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an operational flowchart illustrating a process for content protection according to at least one embodiment;

DETAILED DESCRIPTION

Figure 1:
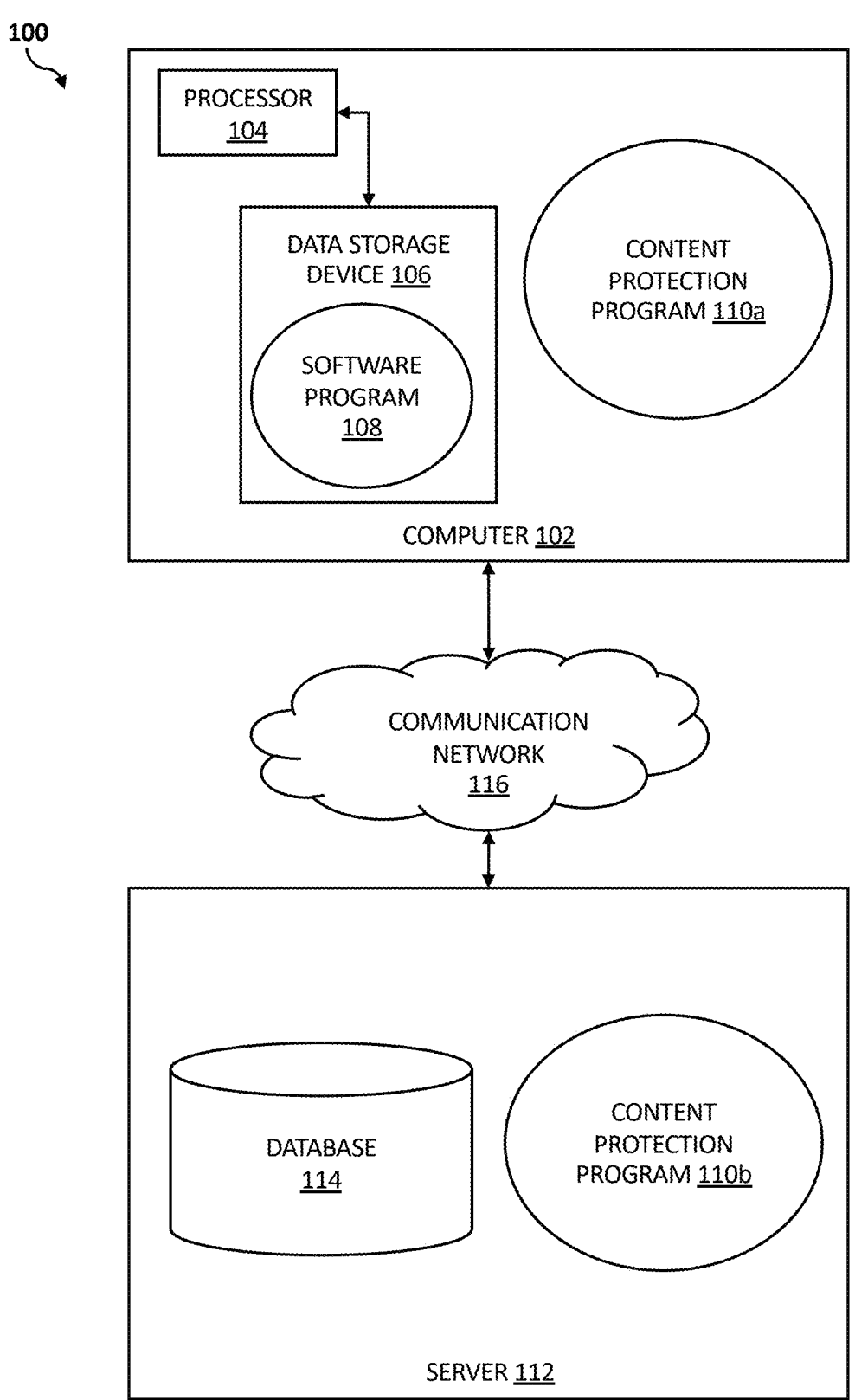
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for protecting published media content from unauthorized usage as part of machine learning datasets. As such, the present embodiment has the capacity to improve the technical field of data protection by augmenting original media content with adverse noise making the media content unusable for various machine learning tasks, where the added noise is generally unnoticeable and imperceptible to humans to prevent negative impact on intended consumers of the media content (e.g., platform end users). More specifically, a content file may be received from a content management system (CMS). Then, at least one feature may be extracted from the received content file. Next, an adversarial generation algorithm may be used to transform the received content file into an adversarial content file. In one embodiment, the adversarial content file may include the received content file, augmented with an adversarial noise. In disclosed embodiments, the adversarial noise may be determined based on the extracted at least one feature. Then, the adversarial content file may be returned to the CMS. In one embodiment, the returned adversarial content file may be accessed by a content consumer and may represent an equivalent, indistinguishable version of the received content file to the content consumer. Thereafter, an application of the returned adversarial content file in at least one machine learning task may be prevented based on the adversarial noise included in the returned adversarial content file.

As described previously, a large quantity of diverse digital media content is published on the Internet and is publicly accessible. In parallel, recent developments within the field of machine learning have driven the need to build datasets of increasing diversity and size. Media content published in publicly accessible repositories (e.g., social networking platform) can be harvested by arbitrary institutions to generate datasets needed for the purpose of building machine learning models. There are many reasons, ranging from GDPR data protection to protecting accumulated data from competitors, for why the custodians of such repositories may not wish to make this media content available to the public for purposes other than the original publication intent of the media content.

A publicly accessible repository may limit access to its published content to third-party institutions by restricting their application programing interface (API) access to the published content. However, since much of the published content is available publicly on the Internet (e.g., not necessarily through an API), it is possible to open a web page containing the published content (e.g., images) and download the content from a regular web browser. The process of doing so automatically may be referred to as scraping and may enable the third-party institution to automatically download large volumes of this content, by by-passing the official API and illegally keeping the media content. Once this media content is harvested by third-party institutions, there is nothing preventing such institutions from using the harvested media content for the unauthorized purpose of building machine learning models.

Accordingly, a publicly accessible repository (e.g., social network platform) may need a way to guarantee that even in the conditions described above, any content scraped and harvested through a web browser will be unusable for unauthorized purposes.

Therefore, it may be advantageous to, among other things, provide a way to modify original media content such that, in the event that the media content is harvested by a third-party institution, the media content (modified by disclosed embodiments) may be made unusable for the purpose of training machine learning models while still guaranteeing that the media content may be consumed in an imperceptible way by the intended content consumers.

According to at least one embodiment, a content protection program may be implemented by one or more content management systems (CMS) responsible for publishing media content. According to embodiments of the present disclosure, a CMS may include any platform or system that stores and publishes content for user consumption. Examples of a CMS, according to disclosed embodiments, may include: social network platforms such as, LinkedIn® (LinkedIn and all LinkedIn-based trademarks and logos are trademarks or registered trademarks of LinkedIn Corporation and/or its affiliates), online news/editorial platforms such as, The New York Times® (The New York Times and all The New York Times-based trademarks and logos are trademarks or registered trademarks of The New York Times Company and/or its affiliates), or any other content providing blogs, portals, or systems.

Other examples of a CMS, according to disclosed embodiments, may include: Joomla® (Joomla and all Joomla-based trademarks and logos are trademarks or registered trademarks of Open Source Matters, Inc. and/or its affiliates), Issuu® (Issuu and all Issuu-based trademarks and logos are trademarks or registered trademarks of Issuu, Inc. and/or its affiliates), and Wordpress® (Wordpress and all Wordpress-based trademarks and logos are trademarks or registered trademarks of Automattic, Inc. and/or its affiliates).

In various embodiments, the content protection program may implement a media content type classifier, a task generation algorithm, and an adversarial content generation algorithm to protect published content from unauthorized usage as part of machine learning datasets.

In one embodiment, the published content may include media content type (e.g., images/photographs, video, audio, text) published on the CMS (e.g., social network platform) by a content publisher and accessible by a content consumer, and more broadly, by the public. According to one embodiment, a content publisher may include any user uploading content to a CMS which in turn may publish that user content. A content publisher may include, for example, a user of a social networking platform who uploads an image file for publication on the social networking platform and a journalist who uploads a text file for publication on an online news platform. According to one embodiment, a content consumer may include anyone consuming content published by the CMS. In some embodiments, the content consumer may include a regular user of the CMS accessing the published content for free (e.g., members in the social network platform). In other embodiments, the content consumer may include a customer of the CMS paying for the published content (e.g., advertising companies).

In one embodiment, the media content type classifier may include any tool capable of determining the type of media (e.g., image/photograph, video, audio, text, or a combination) included in the published content. In one embodiment, the task generation algorithm may include any tool capable of determining, given a media content type, what potential machine learning tasks could the published content be selected for as a dataset example. In one embodiment, adversarial content generation may include any adversarial content generation algorithm capable of transforming a given content medium into an adversarial equivalent. In at least one embodiment, the generated adverse content medium may consist of the original content medium augmented with adversarial noise aimed at decreasing the performance of various machine learning models. Examples of the adversarial content generation algorithm may include, without limitations, any attack contained within the Adversarial Robustness Toolbox (ART) of The Linux Foundation® (The Linux Foundation and all The Linux Foundation-based trademarks and logos are trademarks or registered trademarks of The Linux Foundation and/or its affiliates), such as, for example, the Fast Gradient Method, the Boundary Attack, and the Carlini and Wagner Attack.

According to at least one embodiment, the content protection program may include a metadata extraction component (e.g., media content type classifier and task generation algorithm), a metadata storage component, and a noise generation engine (e.g., adversarial content generation algorithm, such as, ART).

According to one embodiment, the metadata extraction component may analyze the content, including but not limited to images, text, video, and audio, being published and may extract information about the content type and determine potential machine learning tasks the content may be used for. In one embodiment, the metadata extraction component may identify the type of adverse noise which may be applied to the content and may also identify the limits of the adverse noise which may be applied to the content while still preserving a certain notion of imperceptibility/utility for the content consumer.

According to one embodiment, the metadata storage component may provide a storage system for the information (e.g., metadata) produced by the metadata extraction component. In various embodiments, the metadata storage component may also maintain an association between the metadata and content (e.g., using a content identifier).

According to one embodiment, the noise generation component may use the information stored in the metadata storage component to inject adversarial noise into the content to protect it from being used in machine learning tasks. In one embodiment, the type of noise and the noise amount may be decided based on the information extracted by the metadata extraction component. In one embodiment, the adversarial noise added to the content may be unique per content or may be unique per recipient of the content, as defined by an optional configuration parameter.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a content protection program 110*a*. The networked computer environment 100 may also include a server 112 (which may interchangeably be referred to as server computer 112) that is enabled to run a content protection program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the content protection program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the content protection program 110*a*, 110*b* (respectively) to publish content to the public while simultaneously protecting the published content from unauthorized usage for machine learning tasks. The content protection system and method are explained in more detail below with respect to FIGS. 2 and 3.

Figure 2:
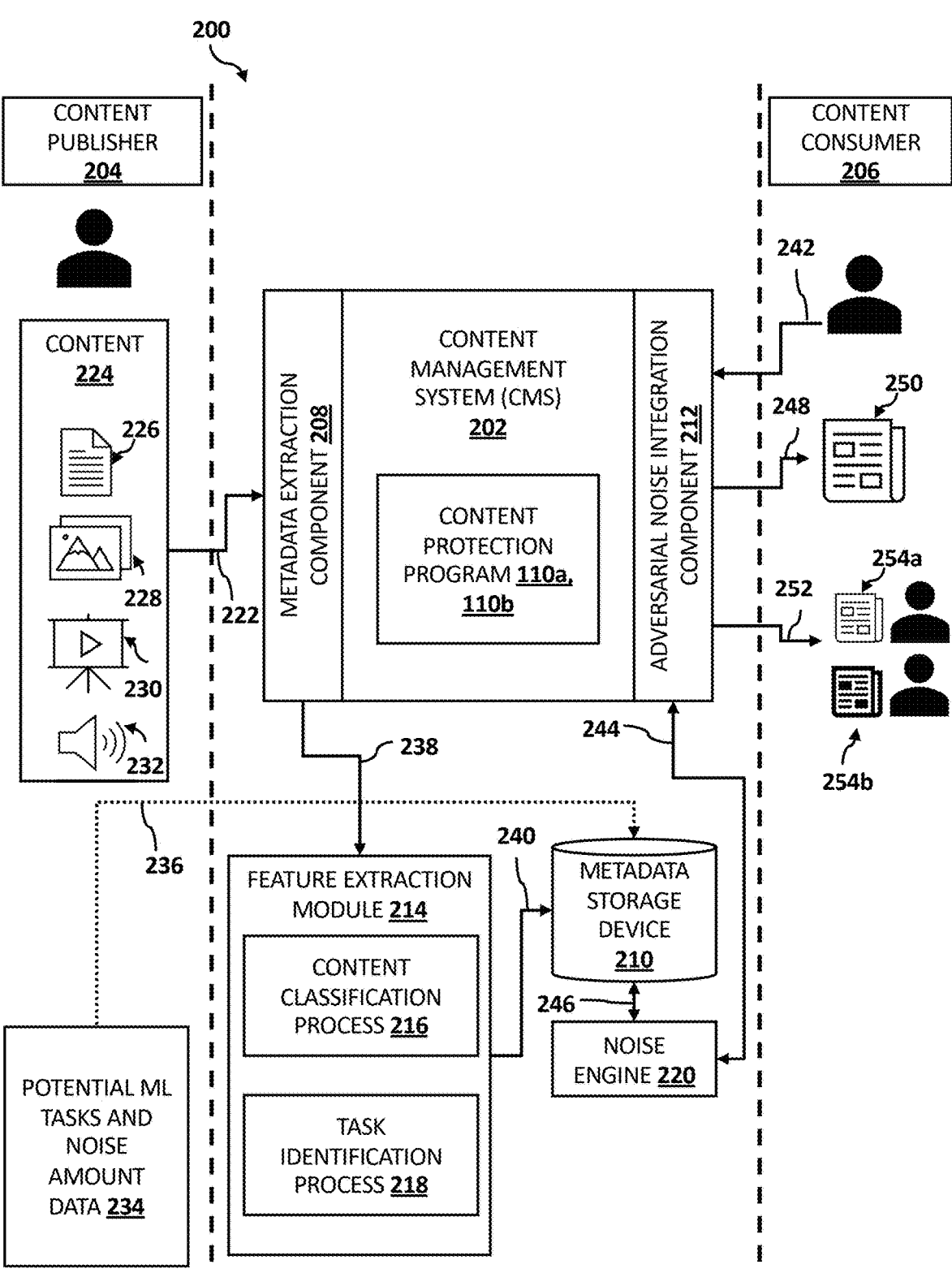
FIG. 2 is a schematic block diagram of a data protection environment implementing according to at least one embodiment.

Referring now to FIG. 2, a schematic block diagram of a data protection environment 200 implementing the content protection program 110*a*, 110*b* according to at least one embodiment is depicted. According to one embodiment, the data protection environment 200 may include one or more components (e.g., client computer 102; server computer 112; communication network 116) of the computer environment 100 discussed above with reference to FIG. 1.

According to one embodiment, the data protection environment 200 may include a content management system (CMS) 202 (e.g., which may refer to computer systems associated with CMS 202), one or more content publishers 204 (e.g., which may refer to computer systems associated with the content publisher 204), and one or more content consumers 206 (e.g., which may refer to computer systems associated with the content consumer 206), linked through a communication network (e.g., communication network 116). In various embodiments, the computer systems associated with the CMS 202, the content publisher 204, and the content consumer 206 may include a workstation, a personal computing device, a laptop computer, a desktop computer, a thin-client terminal, a tablet computer, a smart telephone, a smart watch or other smart wearable, or other electronic devices.

According to one embodiment, CMS 202 may include a tangible storage device and a processor that is enabled to run the content protection program 110*a*, 110*b*. In one embodiment, the content protection program 110*a*, 110*b* may include a single computer program or multiple program modules or sets of instructions being executed by the processor of the CMS 202. The content protection program 110*a*, 110*b* may include routines, objects, components, units, logic, data structures, and actions that may perform particular tasks or implement particular abstract data types. The content protection program 110*a*, 110*b* may be practiced in distributed cloud computing environments where tasks may be performed by remote processing devices which may be linked through the communication network. In one embodiment, the content protection program 110*a*, 110*b* may include program instructions that may be collectively stored on one or more computer-readable storage media.

According to at least one embodiment, the content protection program 110*a*, 110*b* may include a metadata extraction component 208, a metadata storage device 210, and an adversarial noise integration component 212. As will be discussed below in further detail, the metadata extraction component 208 may implement a feature extraction module 214, including a content classification process 216 and a task identification process 218, and the adversarial noise integration component 212 may implement a noise engine 220.

According to one embodiment, at event 222, the content publisher 204 may submit a content file 224 (for publication) to the CMS 202, which may be enabled with the content protection program 110*a*, 110*b*. CMS 202 may include any platform or system that stores and publishes content for user consumption, such as, for example, social networking platforms, online news platforms, or any other content providing blogs, or portals. In one embodiment, content publisher 204 may include any user uploading content (e.g., content file 224) to CMS 202 which in turn may publish that user content for the content consumer 206. Accordingly, the content consumer 206 may include anyone consuming content published by the CMS 202. In one embodiment, the content publisher 204 may also include the content consumer 206. For instance, the content publisher 204 may upload the content file 224 to the CMS 202. Once the content of the content file 224 is published by the CMS 202, the content publisher 204—now the content consumer 206— may view the content file 224 published by the CMS 202.

In various embodiments, the content file 224 may also be referred to as content, media content, published content, published media content, or any other suitable equivalent term in the disclosure. In one embodiment, the content file 224 may include any content or media type, such as, for example, a text file 226, an image file 228, a video file 230, and an audio file 232. The content file 224 may also include any combination of the disclosed content or media types.

According to one embodiment, the content protection program 110*a*, 110*b* may also enable the content publisher 204 to specify additional information regarding the content file 224, such as, the potential machine learning (ML) tasks which the content file 224 should be protected against and the adversarial noise amount which should be injected into the content file 224. If one or more potential ML tasks and noise amount data 234 is provided by the content publisher 204, then at event 236, the content protection program 110*a*, 110*b* may store the one or more potential ML tasks and noise amount data 234 in the metadata storage device 210. If the potential ML tasks and noise amount data 234 is not provided by the content publisher 204, then the content protection program 110a, 110b may apply a best effort approach to infer such information using the metadata extraction component 208.

According to one embodiment, at event 238, the CMS 202 may send the files (e.g., content file 224 submitted by content publisher 204) to which adverse noise may be added, to the feature extraction module 214. After receiving the content file 224, the feature extraction module 214 may implement the content classification process 216 to categorize the content file type (e.g., image, audio, video, text, or combination), and may implement the task identification process 218 to infer potential ML applications for content file 224. In one embodiment, the feature extraction module 214 may also identify the type of adverse noise which may be added to the content file 224 and infer the boundaries (e.g., upper and lower limits of the added noise), such as the amount of adverse noise that may be received by the content file 224 before losing utility for its original purpose (e.g., use by content consumer 206).

Then at event 240, the features (e.g., content type, potential ML application, adverse noise type, adverse noise limit) extracted by the feature extraction module 214 may be stored as metadata in the metadata storage device 210. In one embodiment, the metadata storage device 210 may assign a unique identifier to the processed content file 224 and may associate the unique identifier with the metadata of the features stored in metadata storage device 210. According to one embodiment, metadata storage device 210 may be distributed over multiple data storage devices included in the computer system of CMS 202, over multiple data storage devices external to the computer system of CMS 202, or a combination thereof. In other embodiments, the metadata storage device 210 may be remote, such as on another server, available via the communication network.

According to some embodiments, at event 242, one or more content consumers 206 (e.g., customers of the CMS 202, end users of the social network/editorial platform) may request access to the published content of content file 224 through usual mechanisms. In one embodiment, the usual mechanisms may include, for example, content consumers interacting with an Internet web browser or a standard API to transmit a request to access the content file 224 published by the CMS 202.

According to one embodiment, at event 244, the CMS 202 may implement the adversarial noise integration component 212 to communicate with the noise engine 220 to inject adversarial noise into the content file 224. In at least one embodiment, event 244 may be triggered by the request from content consumer 206, at event 242, to access the content file 224.

Then at event 246, the noise engine 220 may retrieve information (e.g., metadata of the extracted features) stored in the metadata storage device 210 regarding the content file 224. In one embodiment, the noise engine 220 may apply the appropriate adversarial noise (e.g., using ART) based on the information retrieved from the metadata storage device 210. In one embodiment, the noise engine 220 may use ART or any other adversarial generation algorithm to transform the content file into an adversarial content file. The adversarial content file may be equivalent to the content file, in terms of utility to the content consumer, but may be augmented or modified with adversarial noise based on one or more of the extracted features. Then, the noise engine 220 may return the adversarial content file to the CMS 202.

According to one embodiment, at event 248, the CMS 202 may then serve an adversarial content file 250 to the content consumers 206 as normal (e.g., via Internet web browser). In response to receiving the request to access the content file 224 from content consumers 206, the CMS 202 may execute the content protection program 110a, 110b to transform the content file 224 into the adversarial content file 250 (e.g., event 246). In other words, the addition of adversarial noise to the content file 224 may include a run-time process executed at each request received from content consumer 206.

In one embodiment, the noise engine 220 may generally add noise to the adversarial content file 250. In some embodiments, as shown in event 252, different noisy versions of the same adversarial content file (e.g., first version 254a and second version 254b) may be served to different content consumers 206, in response to respective requests. In other embodiments, different noisy versions of the same adversarial content file may be served to the same content consumer 206 upon different requests.

According to one embodiment, the noise engine 220 may determine the adverse noise limit by balance two considerations: protecting the content file from use in potential machine learning applications and maintaining an equivalent representation between the content file and the adversarial content file transmitted to the content consumer 206.

It is contemplated that the added noise may be unnoticeable and imperceptible to human users. From the point of view of the content consumer 206 (e.g., human users), the adversarial content file 250 will look and function the same as the content file 224 submitted by the content publisher 204. However, the adversarial content file 250, which may now be available to the public as a result of the content protection program 110a, 110b, may protect the underlying content (e.g., from content file 224) from unauthorized usage by machine learning model engineers.

Referring now to FIG. 3, an operational flowchart illustrating the exemplary content protection process 300 used by the content protection program 110a, 110b according to at least one embodiment is depicted.

At 302, a content file is received from a content management system (CMS). According to one embodiment, the content protection program 110a, 110b may receive a content file (e.g., image, video, audio, text, or combination) from the CMS, which was submitted for publication by a content publisher, as described previously with reference to FIG. 2.

For example, a CMS, such as a professional social networking platform, may invite its platform users (e.g., content publisher) to publish photographs of themselves to enhance their public professional profiles. Each user's profile photograph may be available to the public for the purpose of browsing professional profiles which may potentially be adequate for an arbitrary set of job applications. The user profiles may also contain information such as the user's name, gender, and age. While this user profile information may be published for the purpose of recruiters wishing to match candidates with open job applications, it may also be used as a source of content to contribute to a dataset used for the purpose of training a machine learning model. For instance, any third-party institution that can access these public profiles, could very easily overtime, scrape and harvest each profile published to the professional social networking platform and categorize each photograph as belonging to a male/female individual. Such a large volume of diverse photographs may be very valuable for the purpose of training a machine learning model capable of classifying whether an image contains the face of a male/female individual. Accordingly, if the social networking platform wants to protect its published content and prevent the content from being used for the unauthorized purpose of training a machine learning model, the social networking platform may implement the content protection program 110a, 110b. In this example, the content file received by the content protection program 110a, 110b may include a photograph of a user of the professional social networking platform.

Then at 304, at least one feature is extracted from the received content file. According to one embodiment, the content protection program 110a, 110b may implement a feature extraction module to categorize the content file type (e.g., image, audio, video, text, or combination) using a media content type classifier and identify potential ML applications for content file using a task generation algorithm. In one embodiment, the feature extraction module may also identify the type of adverse noise which may be added to the content file to protect the content against the unauthorized machine learning task and determine the amount of adverse noise which may be added to the content file, such that the content file is protected, but does not lose utility for its original purpose, as described previously with reference to FIG. 2.

Continuing with the previous example, the feature extraction module may extract two features from the content file received from the professional social networking platform. First, the media content type classifier may be used to determine that the content file is a photograph, and therefore an image file. Second, the task generation algorithm may infer that the image file may be used in a dataset to train a machine learning model to classify images. Accordingly, the features extracted by the content protection program 110a, 110b from the content file may include, content type: image file; potential ML application: image classification.

Then at 306, an adversarial generation algorithm is used to transform the received content file into an adversarial content file, where the adversarial content file includes the received content file, augmented with an adversarial noise based on the extracted at least one feature. According to one embodiment, the features extracted at 304 may be stored as metadata of the content file in a metadata storage component (e.g., via linking the metadata with a unique identifier associated with the content file), as described previously with reference to FIG. 2. According to one embodiment, in response to receiving a request from a content consumer to access the content file, the CMS may execute the content protection program 110a, 110b to transform the content file into an adversarial content file, as described previously with reference to FIG. 2. The content protection program 110a, 110b may implement an adversarial noise integration component to identify the stored features of the content file and apply the appropriate adversarial noise based on the information retrieved from the metadata storage component. As described previously with reference to FIG. 2, any adversarial generation algorithm, suitable based on the extracted features of the content file, may be used to transform the content file into an adversarial content file. The adversarial content file may be equivalent to the content file, in terms of utility to the content consumer, but may be augmented or modified with adversarial noise based on one or more of the extracted features.

Continuing with the previous example, a content consumer, such as, for example, a job recruiter interacting with the professional social networking platform may select the photograph (e.g., content file) of a user to view the user's profile. In response to the received request for the content file, the professional social networking platform may execute the content protection program 110a, 110b. The content protection program 110a, 110b may implement an adversarial noise integration component to identify the stored features of the photograph and apply the appropriate adversarial noise based on the information retrieved from the metadata storage component. The stored features of the photograph may indicate that the content type is an image file and the potential ML application include image classification. Based on these features, the content protection program 110a, 110b may add a layer of adversarial noise to the image file to prevent the image file from being used in a dataset for image classification.

Then at 308, the adversarial content file is returned to the CMS, where the returned adversarial content file represents an equivalent of the received content file to a content consumer. According to one embodiment, in response to receiving the request to access the content file from content consumers, the CMS may execute the content protection program 110a, 110b to transform the content file into the adversarial content file. The adversarial content file returned to the CMS may then be transmitted to the content consumer as a response to the request received from content consumer. As described previously, from the point of view of the content consumer (e.g., human users), the adversarial content file will look and function the same as the content file submitted by the content publisher.

Continuing with the previous example, the content protection program 110a, 110b may return to the professional social networking platform, an adversarial content file including the photograph of the user selected by the job recruiter. The professional social networking platform may transmit the photograph of the user to the job recruiter via an Internet web browser. The job recruiter may not be aware or realize that the photograph being displayed on their Internet web browser contains adversarial noise.

Thereafter at 310, an application of the returned adversarial content file in at least one machine learning task is prevented based on the adversarial noise included in the returned adversarial content file. Although human users may not be able to perceive a difference between the content file and the adversarial content file, the adversarial noise added in the adversarial content file may be detected by a computing device. As such, even if the returned adversarial content file is harvested by a third-party institution and incorporated into a dataset for machine learning, the adversarial noise added in the adversarial content file may deteriorate the performance of a machine learning model.

Continuing with the previous example, images may be scrapped and harvested from the professional social networking platform by a third-party institution. However, as a result of the content protection program 110a, 110b, each image retrieved from the professional social networking platform may include adversarial noise (e.g., adversarial content file), as described above. Any dataset including the adversarial content files may be unusable for machine learning tasks.

The content protection program 110a, 110b may improve functionality of a computer because the content protection program 110a, 110b may enable the computer to modify original media content such that, in the event that the media content is harvested by a third-party institution, the media content (modified by disclosed embodiments) may be made unusable for the purpose of training machine learning models while still guaranteeing that the media content may be consumed in an imperceptible way by the intended content consumers.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
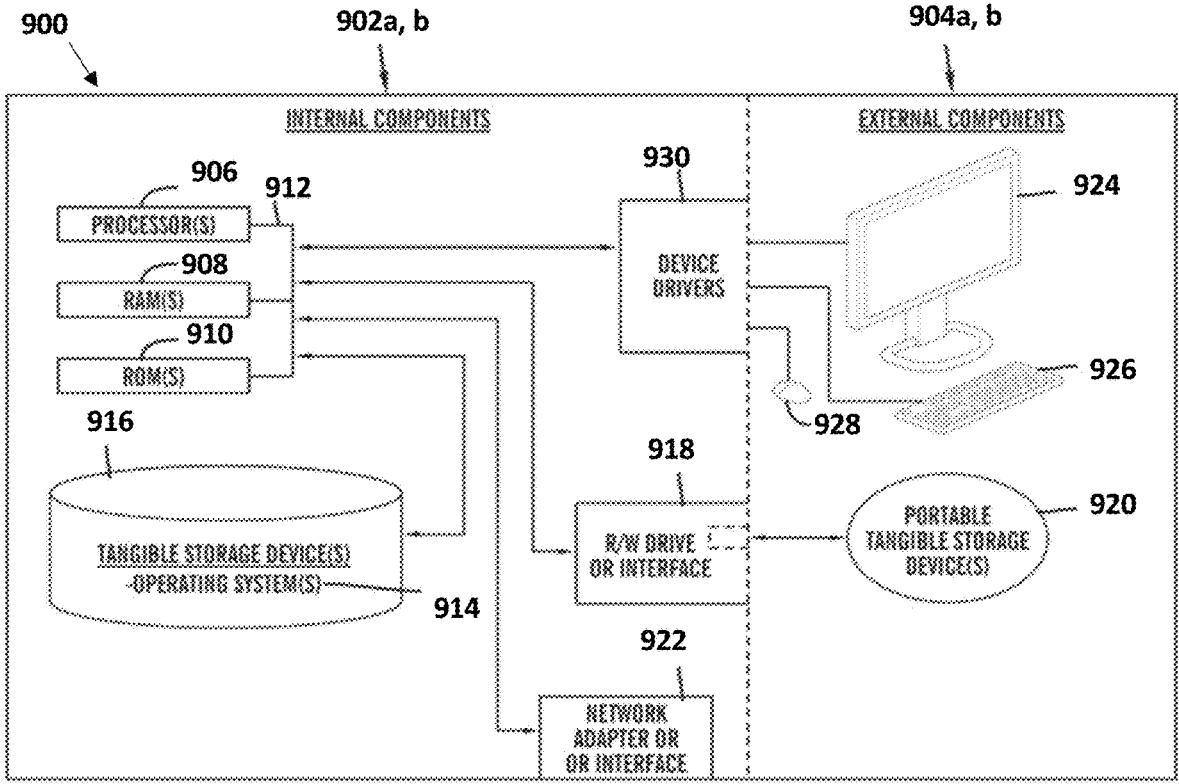
FIG. 4 is a block diagram of internal and external components of computers and servers depicted in FIG. 1 according to at least one embodiment.

FIG. 4 is a block diagram of a data processing system 900 including internal components 902*a, b* and external components 904*a, b* of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 900 is representative of any electronic device capable of executing machine-readable program instructions. Data processing system 900 may be representative of a smart phone, a computer system, PDA, or other electronic devices. Examples of computing systems, environments, and/or configurations that may represented by data processing system 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902*a, b* and external components 904*a, b* illustrated in FIG. 4. Each of the sets of internal components 902*a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the content protection program 110*a* in client computer 102, and the content protection program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902*a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the content protection program 110*a* and 110*b* can be stored on one or more of the respective portable computer-readable tangible storage devices 920, read via the respective R/W drive or interface 918 and loaded into the respective hard drive 916.

Each set of internal components 902*a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the content protection program 110*a* in client computer 102 and the content protection program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the content protection program 110*a* in client computer 102 and the content protection program 110*b* in network server computer 112 are loaded into the respective hard drive 916. The network may comprise copper wires, optical fibers, wireless transmission, routers, firewalls, switches, gateway computers and/or edge servers.

Each of the sets of external components 904*a, b* can include a computer display monitor 924, a keyboard 926, and a computer mouse 928. External components 904*a, b* can also include touch screens, virtual keyboards, touch pads, pointing devices, and other human interface devices. Each of the sets of internal components 902*a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
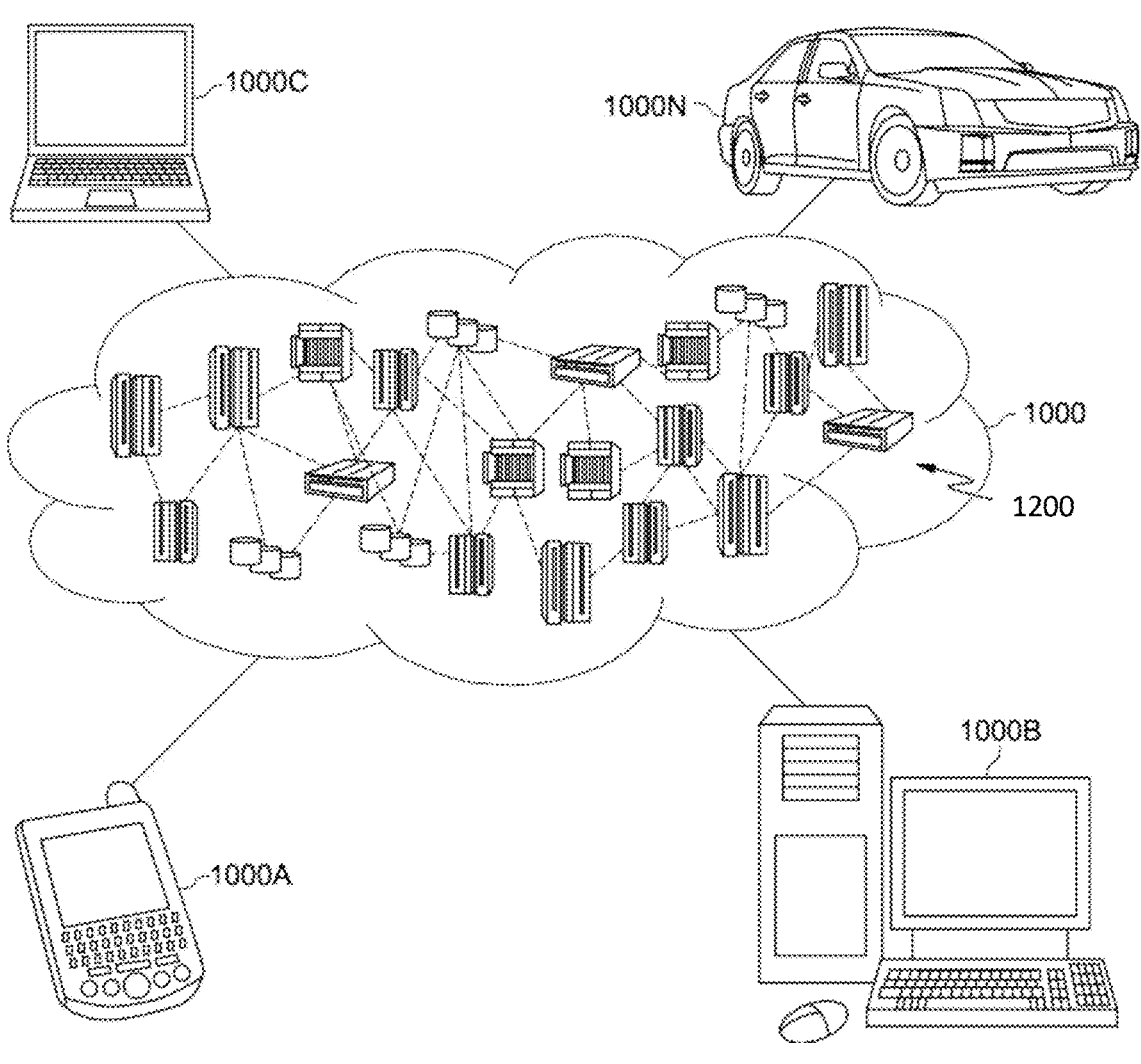
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 1200 (e.g., server 112) with which local computing devices (e.g., client computer 102) used by cloud consumers, such as, for example, personal digital assistant (PDA) or cellular telephone 1000A, desktop computer 1000B, laptop computer 1000C, and/or automobile computer system 1000N may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1200 and cloud computing environment 1000 can communicate with any type of computerized device over any type of network and/or network addressable connection (e.g., using a web browser).

Figure 6:
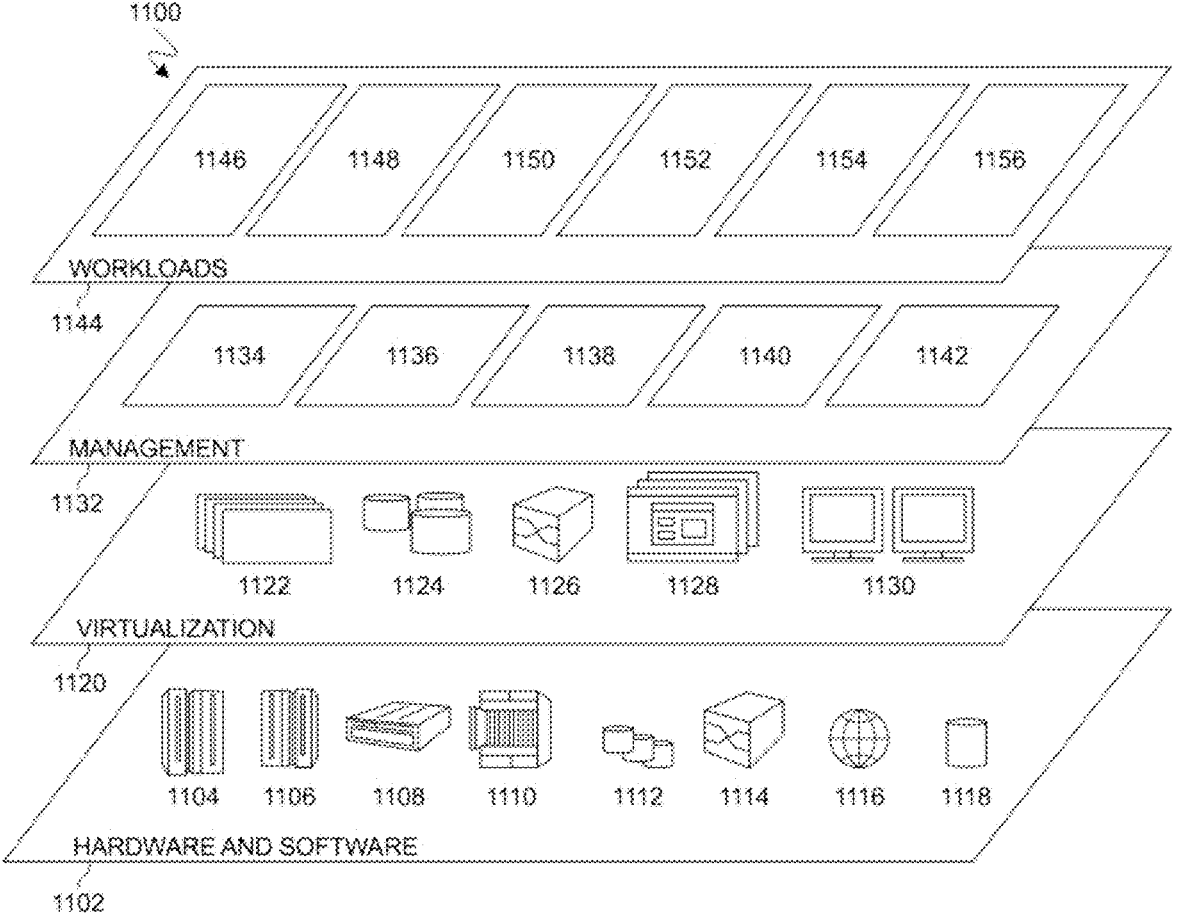
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and content protection 1156. A content protection program 110a, 110b provides a way to publish content to the public while simultaneously protecting the published content from unauthorized usage for machine learning tasks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a content file from a content management system (CMS);
extracting at least one feature from the received content file to determine, from a plurality of machine learning tasks, at least one machine learning task for a media type of the received content file;
determining an adverse noise limit by balancing competing objectives of reducing performance of the at least one machine learning task on the received content file and maintaining an equivalent representation of the received content file for a human content consumer;
selecting, based on the media type and the at least one machine learning task associated with the received content file, an adversarial generation algorithm;
controlling the adversarial generation algorithm to apply adversarial noise within the determined adverse noise limit to transform the received content file into an adversarial content file, wherein the adversarial content file maintains the equivalent representation of the received content file for the human content consumer and reduces the performance of the at least one machine learning task on the adversarial content file; and
returning the adversarial content file to the CMS.

2. The method of claim 1, further comprising:
in response to receiving, from the human content consumer, a request to access the received content file, transforming the received content file into the adversarial content file, wherein the adversarial content file is transmitted to the human content consumer.

3. The method of claim 1, wherein the extracted at least one feature is selected from the group consisting of a content type, a potential machine learning task, an adverse noise type, and the adverse noise limit.

4. The method of claim 2, further comprising:
in response to receiving a first request to access the received content file from a first content consumer, transforming the received content file into a first version of the adversarial content file, wherein the first version of the adversarial content file is transmitted to the first content consumer; and
in response to receiving a second request to access the received content file from a second content consumer, transforming the received content file into a second version of the adversarial content file, wherein the second version of the adversarial content file is transmitted to the second content consumer, wherein the first version of the adversarial content file and the second version of the adversarial content file represent different noisy versions of the received content file to the first content consumer and the second content consumer, respectively.

5. The method of claim 1, further comprising:
in response to receiving, from the human content consumer, a request to access the received content file, executing a run-time process, comprising:
retrieving, from a metadata storage device, the extracted at least one feature of the received content file using a unique identifier associated with the received content file, wherein the metadata storage device is configured to store the extracted at least one feature with the unique identifier associated with the received content file;
selecting the adversarial generation algorithm based on the extracted at least one feature of the received content file including the media type and the at least one machine learning task; and
transforming the received content file into the adversarial content file using the selected adversarial generation algorithm by executing the selected adversarial generation algorithm to generate and apply the adversarial noise subject to the adverse noise limit, the adverse noise limit constraining an amount of the adversarial noise applied to the received content file.

6. A computer system for published content protection, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving a content file from a content management system (CMS);
extracting at least one feature from the received content file to determine, from a plurality of machine learning tasks, at least one machine learning task for a media type of the received content file;
determining an adverse noise limit by balancing competing objectives of reducing performance of the at least one machine learning task on the received content file and maintaining an equivalent representation of the received content file for a human content consumer;
selecting, based on the media type and the at least one machine learning task associated with the received content file, an adversarial generation algorithm;
controlling the adversarial generation algorithm to apply adversarial noise within the determined adverse noise limit to transform the received content file into an adversarial content file, wherein the adversarial content file maintains the equivalent representation of the received content file for the human content consumer and reduces the performance of the at least one machine learning task on the adversarial content file; and
returning the adversarial content file to the CMS.

7. The computer system of claim 6, further comprising:
in response to receiving, from the human content consumer, a request to access the received content file, transforming the received content file into the adversarial content file, wherein the adversarial content file is transmitted to the human content consumer.

8. The computer system of claim 6, wherein the extracted at least one feature is selected from the group consisting of a content type, a potential machine learning task, an adverse noise type, and the adverse noise limit.

9. The computer system of claim 7, further comprising:
in response to receiving a first request to access the received content file from a first content consumer, transforming the received content file into a first version of the adversarial content file, wherein the first version of the adversarial content file is transmitted to the first content consumer; and
in response to receiving a second request to access the received content file from a second content consumer, transforming the received content file into a second version of the adversarial content file, wherein the second version of the adversarial content file is transmitted to the second content consumer, wherein the first version of the adversarial content file and the second version of the adversarial content file represent different noisy versions of the received content file to the first content consumer and the second content consumer, respectively.

10. The computer system of claim 6, further comprising:
in response to receiving, from the human content consumer, a request to access the received content file, executing a run-time process, comprising:
retrieving, from a metadata storage device, the extracted at least one feature of the received content file using a unique identifier associated with the received content file, wherein the metadata storage device is configured to store the extracted at least one feature with the unique identifier associated with the received content file;
selecting the adversarial generation algorithm based on the extracted at least one feature of the received content file including the media type and the at least one machine learning task; and
transforming the received content file into the adversarial content file using the selected adversarial generation algorithm by executing the selected adversarial generation algorithm to generate and apply the adversarial noise subject to the adverse noise limit, the adverse noise limit constraining an amount of the adversarial noise applied to the received content file.

11. A computer program product for published content protection, comprising:
one or more computer readable storage media and program instructions collectively stored on the one or more computer readable storage media, the program instructions executable by a processor to cause the processor to perform a method comprising:
receiving a content file from a content management system (CMS);
extracting at least one feature from the received content file to determine, from a plurality of machine learning tasks, at least one machine learning task for a media type of the received content file;
determining an adverse noise limit by balancing competing objectives of reducing performance of the at least one machine learning task on the received content file and maintaining an equivalent representation of the received content file for a human content consumer;
selecting, based on the media type and the at least one machine learning task associated with the received content file, an adversarial generation algorithm;

controlling the adversarial generation algorithm to apply adversarial noise within the determined adverse noise limit to transform the received content file into an adversarial content file, wherein the adversarial content file maintains the equivalent representation of the received content file for the human content consumer and reduces the performance of the at least one machine learning task on the adversarial content file; and
returning the adversarial content file to the CMS.

12. The computer program product of claim 11, further comprising:
in response to receiving, from the human content consumer, a request to access the received content file, transforming the received content file into the adversarial content file, wherein the adversarial content file is transmitted to the human content consumer.

13. The computer program product of claim 11, wherein the extracted at least one feature is selected from the group consisting of a content type, a potential machine learning task, an adverse noise type, and the adverse noise limit.

14. The computer program product of claim 11, further comprising:
in response to receiving, from the human content consumer, a request to access the received content file, executing a run-time process, comprising:
retrieving, from a metadata storage device, the extracted at least one feature of the received content file using a unique identifier associated with the received content file, wherein the metadata storage device is configured to store the extracted at least one feature with the unique identifier associated with the received content file;
selecting the adversarial generation algorithm based on the extracted at least one feature of the received content file including the media type and the at least one machine learning task; and
transforming the received content file into the adversarial content file using the selected adversarial generation algorithm by executing the selected adversarial generation algorithm to generate and apply the adversarial noise subject to the adverse noise limit, the adverse noise limit constraining an amount of the adversarial noise applied to the received content file.

15. The computer program product of claim 12, further comprising:
in response to receiving a first request to access the received content file from a first content consumer, transforming the received content file into a first version of the adversarial content file, wherein the first version of the adversarial content file is transmitted to the first content consumer; and
in response to receiving a second request to access the received content file from a second content consumer, transforming the received content file into a second version of the adversarial content file, wherein the second version of the adversarial content file is transmitted to the second first content consumer, wherein the first version of the adversarial content file and the second version of the adversarial content file represent different noisy versions of the received content file to the first content consumer and the second content consumer, respectively.

* * * * *